April 14, 1953 — E. E. COOPER — 2,634,996
HOOK FASTENER
Filed July 11, 1951
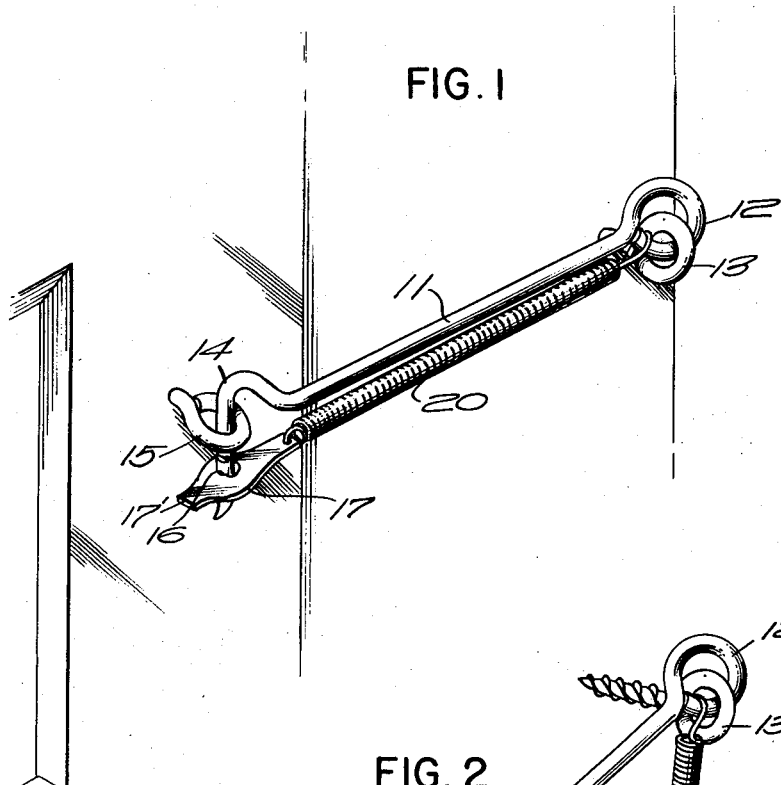
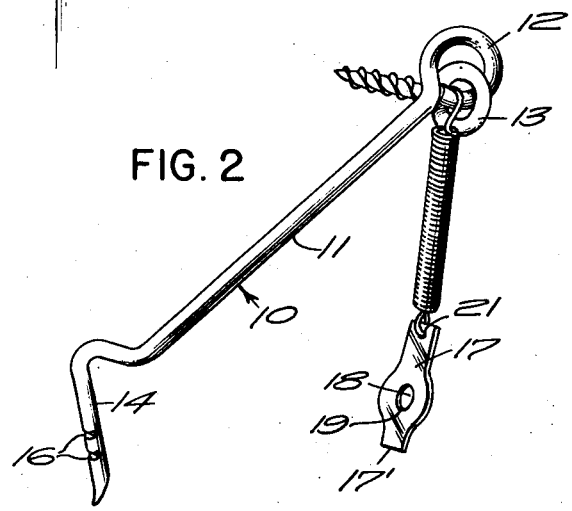
INVENTOR.
Ernest E. Cooper
BY Barlow & Barlow
ATTORNEYS Patented Apr. 14, 1953

2,634,996

UNITED STATES PATENT OFFICE 2,634,996

HOOK FASTENER

Ernest E. Cooper, Wickford, R. I.

Application July 11, 1951, Serial No. 236,258

4 Claims. (Cl. 292—108)

This invention relates to improvements in a hook fastener device, particularly a lock arrangement for maintaining said hook in the closed position against accidental or otherwise unauthorized removal.

An object of this invention is to provide a locking arrangement in a hook fastener of the above character so as to enhance the general utility of this type of fastener.

Another object of the invention is to provide in a hook fastener of the above character a lock arrangement which will be of a simple construction adapted to be easily placed in and out of locking position and which further may be added to the conventional hook fastener with a minimum of modification of the hook structure.

A more specific object of the invention is to provide in a hook fastener of the above character a lock arrangement so constructed and related to the hook portion of the fastener as to require the lock to be manually placed in locking position.

With these and other objects in view, the invention consists of certain novel features of construction, as will be more fully described and particularly pointed out in the appended claims.

In the accompanying drawings:

Figure 1 is a perspective view of a hook fastener provided with a lock arrangement embodying one form of the invention; and Figure 2 is a perspective view of the hook portion of the fastener with the lock shown in the inactive position.

Referring to the drawings for a more detailed description of the invention, 10 designates generally a conventional hook type fastener having a shank 11 which is provided at one end portion thereof with a fastening eye 12 made integral with the said shank. To this eye 12 there is attached a conventional screw eye 13 by which the said hook fastener is attached in place. A hook 14 is formed at the other end of the shank 11 integral therewith and is adapted to be passed through a keeper 15 which is also in the form of a screw eye. The hook fastener so far described is, as above indicated, of the conventional type.

In carrying out my invention, I notch the hook portion 14 at its outer edge as at 16. There may be a plurality of said notches, two being shown. These notches are placed on the side of the hook to be in line generally with the shank 11. A lock plate 17 having a lip 17' is provided with an opening 18 which is of a size to receive the hook portion 14. The marginal edge 19 of the plate 17 about the opening 18 is received in either of said notches 16, as shown in Figure 1.

A pull spring 20 has one end anchored to the eye 12 and the other end thereof attached to the plate as shown at 21 and provides a resilient tension to yieldingly hold the said plates 17 in engagement with the notches 16. The plate 17 is of a dimension so as to prevent its being passed through the keeper and provides an abutment to engage against the underside of the keeper which prevents the hook from being shaken out of engagement with the keeper. To remove the plate from locked engagement, it is merely necessary to grasp the lip 17' to pull the plate out from the notch 16 and be passed out of engagement with the said hook portion 14, whereupon the said plate is released to be suspended from the eye 12 of the hook, as shown in Figure 2.

It will be apparent that when the locked plate 17 is in the inactive position, the same cannot accidentally position itself in the locking relation and it will be necessary to manually place said plate in the locking position, this being a desirable feature, since in some instances of application of the fastener, it may be desired to hook the fastener to the keeper 15 and omit locking the same in position. It will also be apparent that the addition of this locking arrangement to the conventional hook merely requires the addition of a notch or notches in the hook portion of the fastener.

I claim:

1. A hook fastener comprising a shank having a hook at one end thereof provided with a notch therein and adapted to be passed through a keeper to position the notched portion beyond the said keeper, a substantially flat lock plate having an opening therein for receiving the said hook portion with the marginal edges about said opening received in said notch, and resilient means yieldingly holding said lock plate in engagement with said notch.

2. A hook as set forth in claim 1 wherein said yielding means is a pull spring.

3. A hook as set forth in claim 1 wherein said hook portion is provided with a plurality of said notches.

4. A hook as set forth in claim 1 wherein said shank has an attaching eye portion and said resilient means is a pull spring anchored at one end to said eye and at the other end to said lock plate.

ERNEST E. COOPER.

References Cited in the file of this patent

UNITED STATES PATENTS

| Number | Name | Date |
| --- | --- | --- |
| 1,468,861 | Hodgson | Sept. 25, 1923 |
| 1,595,511 | Geisel | Aug. 10, 1926 |
| 2,548,189 | Armstrong | Apr. 10, 1951 |